UNITED STATES PATENT OFFICE.

JAMES O. GREEN AND CHARLES H. PEARSE, OF WHITEWATER, WISCONSIN.

PROCESS OF BRAZING CAST-IRON.

No. 798,332. Specification of Letters Patent. Patented Aug. 29, 1905.

Application filed February 4, 1905. Serial No. 244,171.

*To all whom it may concern:*

Be it known that we, JAMES O. GREEN and CHARLES H. PEARSE, citizens of the United States, residing at the city of Whitewater, in the county of Walworth and State of Wisconsin, have invented certain new and useful Improvements in Processes of Brazing Cast-Iron, of which the following is a specification.

This invention relates to a new and improved method or process of brazing cast-iron to cast-iron or to other metals capable of uniting with brass.

Steel and wrought-iron can easily be brazed, and cast-iron is difficult to braze only on account of the excess of carbon and silicon it contains. In order to braze cast-iron, it is necessary to change the surfaces to be united by reducing the carbon and silicon therein until such surfaces become steel. This can be accomplished by the use of any brazing compound which will give up oxygen in such quantity and in such a manner that it will unite with the carbon of the cast-iron and pass off as carbon monoxid. This it can do when released from its compound at a temperature above the combining temperature of carbon and oxygen. In order to obtain good results in brazing, the walls of the joint must be brought closely together, in actual contact, if possible, and this is not possible where the ordinary brazing powder or paste is coated over the surfaces of the break. Also it is a well-known fact that chemical action is more thorough where the uniting elements, as carbon and oxygen, are in close and intimate contact.

In carrying out our process we clean the iron of rust and grease when necessary and rub or grind with a spatula or by other suitable means any fine brazing-powder capable at a proper temperature of giving up oxygen or carbon dioxid into the pores of the surfaces to be brazed. By the word "pores" we mean all small cavities in the iron capable of receiving and retaining the powder and which may be filled without changing the form of the surface, so as to prevent close contact of the parts to be brazed. We then bring the walls of the break or the two surfaces to be joined into actual contact and fasten them together by pegs, wires, clamps, or other suitable means. We then raise the temperature of the parts almost to a white heat and proceed as in ordinary brazing.

We do not limit ourselves to any particular powder or composition in this process, but may use any powder fulfilling the above conditions.

What we claim as new, and desire to secure by Letters Patent, is—

The process of brazing cast-iron by cleaning the surfaces to be brazed and then rubbing, grinding or forcing into the pores of said surfaces by any suitable means any fine powder capable at a proper temperature of giving up oxygen or carbon dioxid, securing the parts together in actual contact, raising the temperature to nearly a white heat and then proceeding as in ordinary brazing.

In testimony whereof we have signed our names to this specification in the presence of two subscribing witnesses.

JAMES O. GREEN.
CHARLES H. PEARSE.

Witnesses:
D. F. ZUILL,
CHARLES A. COLBERT.